United States Patent [19]

Jonasson

[11] Patent Number: 4,907,624
[45] Date of Patent: Mar. 13, 1990

[54] THERMOSETTING RESIN PIPE

[75] Inventor: Vollmar Jonasson, Lycksele, Sweden

[73] Assignee: Inpipe Aktiebolag, Vilhelmina, Sweden

[21] Appl. No.: 847,106

[22] Filed: Apr. 3, 1986

Related U.S. Application Data

[63] Continuation of Ser. No. 715,760, Mar. 25, 1985, abandoned, which is a continuation of Ser. No. 294,779, Aug. 20, 1981, abandoned, which is a continuation of Ser. No. 168,398, Jul. 10, 1980, abandoned, which is a continuation of Ser. No. 931,010, Aug. 4, 1978, abandoned.

[30] Foreign Application Priority Data

Jul. 7, 1978 [SE] Sweden .................................. 7808229

[51] Int. Cl.$^4$ .............................................. F16L 9/14
[52] U.S. Cl. .................................... 138/125; 138/103; 138/123; 138/137; 138/178; 156/149
[58] Field of Search ............... 138/103, 123, 125, 126, 138/127, 137, 140, 172, 178, DIG. 8; 156/149, 189, 194, 287; 264/236, 320, 339, 239, DIG. 50, DIG. 59

[56] References Cited

U.S. PATENT DOCUMENTS

| | | | |
|---|---|---|---|
| 2,238,058 | 4/1941 | Johnson et al. | 138/123 X |
| 2,723,426 | 11/1955 | Pelley | 156/194 X |
| 2,724,673 | 11/1955 | Hunter | 156/149 |
| 2,743,759 | 5/1956 | Snow et al. | 156/194 X |
| 3,287,315 | 11/1966 | Connor et al. | 138/137 X |
| 4,106,968 | 8/1978 | Kutayak et al. | 138/DIG. 8 |

Primary Examiner—James E. Bryant, III
Attorney, Agent, or Firm—Cushman, Darby & Cushman

[57] ABSTRACT

A pipe of thermosetting resin, characterized in that it comprises a layer of curable thermosetting resin enclosed between a hose-shaped inner foil and a hose-shaped outer foil, which layer in its curable state together with said two foils forms the shape of a flexible foldable hose, in which shape the pipe can be laid in place and subsequently given its final shape and is made shape permanent by curing the thermosetting resin, said layer of curable thermosetting resin being reinforced by a fabric reinforcement braided of thread systems movable relative to each other, which fabric reinforcement owing to the relative movability of the thread systems can be widened and contracted to change the diameter of the pipe in the form of a flexible hose, and said thread systems being interlocked by the thermosetting resin in its cured state.

11 Claims, 5 Drawing Sheets

THERMOSETTING RESIN PIPE

This is a continuation of application Ser. No. 715,760 filed 25 Aug. 1985 (abandoned), which was a continuation of Ser. No. 294,779 filed Aug. 20, 1981 (abandoned), which was a continuation of Ser. No. 168,398 filed July 10, 1980 (now abandoned) which was a continuation of application Ser. No. 931,010 filed Aug. 4, 1978 (now abandoned).

This invention relates to pipes of thermosetting resin. It comprises also a method and an apparatus for manufacturing such pipes and further a method of giving to the pipe its final inherently stable form by curing in connection with the application of the pipe according to the invention in, for example, an already existing conduit.

One of the problems, on which particularly the present invention is based and for which it provides the solution, are the substantial difficulties, which have been and still are involved when by conventional methods and known technique conduits, which already are laid in the ground or in culverts, such as sewage pipes and water pipes, and also surface conduits, for example pipelines, are to be renovated, repaired and/or reinforced or replaced in a simple, efficient and cheap way, and also to cope with the considerable leakage of surface water and ground water which takes place due to porosity into a large part of existing sewage conduits usually consisting of concrete or cement pipes, even when the pipes are intact. Due to this leakage of water into existing sewage conduits, the sewage water amount is increased substantially and, consequently, the costs of purifying the sewage water are increased considerably. Much would be gained, if this unnecessary leakage of water into the sewage conduits could be stopped in a simple manner.

The present invention, therefore has the object of solving the aforesaid problems. This object is achieved by the pipe according to the invention which is of such a nature that it can be applied or laid in place in a flexible and foldable state and after its application or laying be given a stable form with high strength against inside and outside pressure. The pipe according to the invention, furthermore, is intended for use as sealing, reinforcement or replacement for pipes or parts of pipes in existing pipelines of usual types, but it is, of course, not restricted to just these fields of application, but can be used also as external or internal lining for objects other than pipes which are desired to be tight and/or reinforced, and it can be used also as a normal pipe.

A second object of the invention is to provide a method and an apparatus for manufacturing such pipes in the form of a flexible, foldable hose in a rational and cheap way, and the ivnention further has the object to teach how in connection with the application or laying of the pipe in said state of a hose the pipe is given its final inherently stable form with high strength against outside and inside pressure.

The pipe according to the invention substantially is characterized in that the thermosetting resin comprised in the pipe is in curable, i.e. not cured state sealed between an inner and an outer foil, which together with the thermosetting resin form a flexible, foldable hose, which hose after its application or laying in position can be formed to the final shape of the pipe, which is made permanent by curing the thermosetting resin. The present pipe, thus, has two states, i.e. one state in the form of a flexible, foldable hose, which in folded state easily can be drawn, for example, into an existing conduit to be sealed, and a shape permanent state, which is achieved, for example, by pressing out the hose to its desired shape and subsequent curing of the thermosetting resin.

According to an embodiment of the invention, the pipe is reinforced in the thermosetting layer with a hose-shaped fabric reinforcement, which consists of inter-braided thread systems, in which the angle between the threads can be changed by stretching or internal pressure, so that the diameter is adjustable between the two states of the pipe.

Further characterizing features and advantages of the present invention become apparent from the attached claims and the description of some advantageous embodiments of the invention subject matter.

The invention is described in the following in greater detail, with reference to the accompanying drawings, in which.

Figure 1:
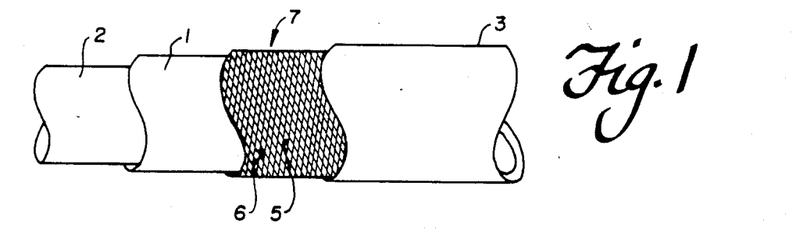
FIG. 1 is a section of a preferred embodiment of the pipe according to the invention, illustrating the component parts of the pipe.
Figure 6:
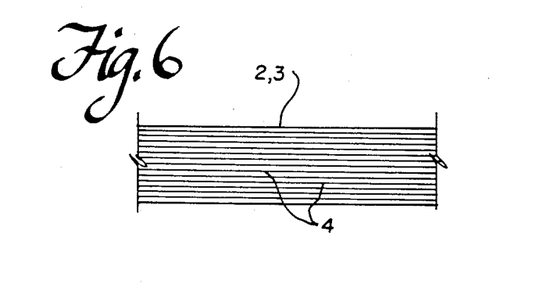
FIG. 6 is a lateral view of a reinforced foil comprised in the pipe.

The pipe according to the invention comprises a layer 1 of thermosetting resin, which is located between a hose-shaped inner foil 2 and a hose-shaped outer foil 3, of which foils 2,3 at least one and preferably both are provided with a longitudinal reinforcement 4, as shown in FIG. 6, in order to increase the tensile strength of the pipe. At the embodiment shown in the drawings, the thermosetting layer is reinforced with a fabric reinforcement 7 of hose shape, which consists of cross-wise braided threads 5,6, and which in FIG. 1 is shown lying in the area adjacent the outer foil 3. The thermosetting resin in the layer 1 includes filler agents in the form of, for example, glass fibre or synthetic fibre flocks, quartz flour and/or asbestos flour. One or several other per se known fillers for plastics, of course, may also be used.

The thermosetting resin, furthermore, is in uncured, i.e. curable, state, in which state it has viscous or dough-like, but plastic consistency or paste-form and is maintained in this curable state until the Pipe has been applied or laid in the place intended. First then and after the pipe has been given its final shape, the thermosetting resin in the layer 1 is cured, and the pipe is thereby stabilized and made entirely shape permanent. For the curing, the thermosetting resin can be prepared in advance with a catalyst, i.e. a hardener, which by pressure or heat initiates and accelerates the curing, or the catalyst can be added to the thermosetting resin in the layer 1 after the pipe has been attached in position. In this latter case, however, the inner foil 2 must be permeable for gas so as to permit the catalyst to penetrate into the thermosetting resin and to initiate the curing. The latter method of applying the catalyst is to be preferred in cases when the time between manufacture and application of the pipe is expected to be relatively long, because the plastic has a shorter storage time when a catalyst has been admixed thereto. The storage time, however, can be extended substantially by storing the pipe at low temperature.

Figure 2:
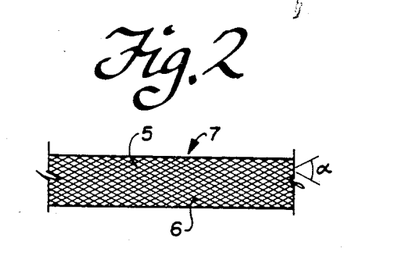
FIGS. 2 and 3 show schematically the reinforcement comprised in the pipe in a first and, respectively, second state.
Figure 3:
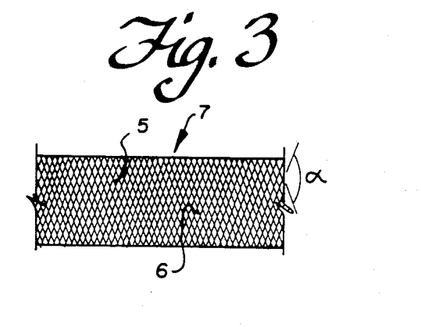
Figure 4:
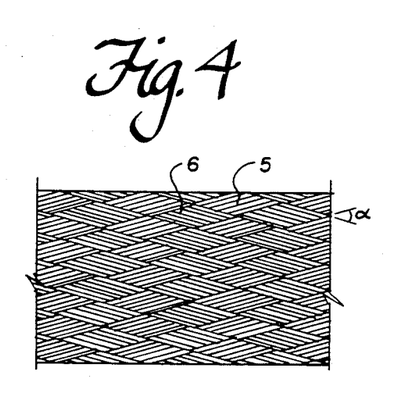
FIGS. 4 and 5 show on an enlarged scale a somewhat modified reinforcement for the pipe in the first and, respectively, second state.
Figure 5:
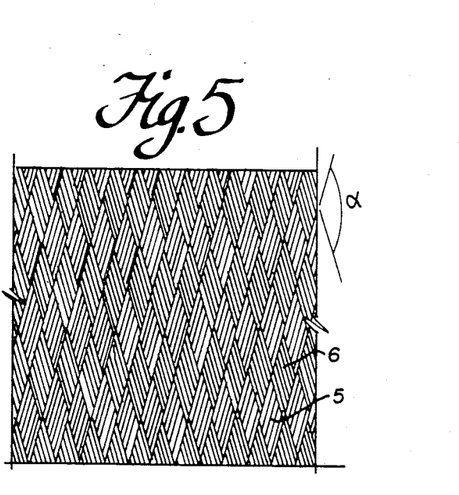

The pipe according to the invention, thus, has two different states, viz. a curable state, in which the pipe has the form of a flexible, foldable hose, and a cured state, in which the pipe is entirely shape permanent. In said state of a flexible hose the fabric reinforcement 7 assumes a first condition, which is shown in FIGS. 2 and 4, and in which the braided threads 5,6 of the fabric reinforcement are not interlocked, but movable relative to each other. In this condition of the reinforcement the angle between the threads 5,6, which in FIGS. 2–5 is designated by $\alpha$, should be as small, i.e. as close to 0°, as possible. Due to the fact that the reinforcement threads 5,6 are movable relative to each other as long as the thermosetting resin in the layer 1 is not cured, said angle can be changed by compressing the reinforcement and pipe or by effecting within the hose a pressure, which causes the threads 5,6 to raise and assume a second condition, which is shown in FIGS. 3 and 5. Thereby the angle $\alpha$ also is increased, as well as the hose diameter, but at the same time the hose, for natural reasons, becomes shorter. The highest and the lowest value said angle $\alpha$ can be caused to assume is slightly less than 180° and, respectively, slightly greater than 0°.

The fabric reinforcement 7 may also consist of monofilaments or of threads containing only a few fibres, but multifilaments or roving are to be preferred in the reinforcement, especially in cases when the hose is to be subjected to inside pressure. By making the reinforcement 7 of roving, the reinforcement as shown in FIGS. 4 and 5, can be made very dense and thereby, in cooperation with the flock material which in ample amounts is contained in the plastic material and particularly in its parts closest to the reinforcement 7, rapidly form an efficient obstacle preventing the plastic material from migrating in the direction outward from within through the reinforcement 7 when the hose is subjected to inside pressure in order to cause the reinforcement to assume its second condition and to give the pipe its final shape. In the beginning, a certain small amount of viscous plastic material may pass between the roving and thread fibres, but with this plastic material also follow along or migrate flocks, which cannot pass through the reinforcement 7, but are stopped and precipitate thereon, thereby clogging the reinforcement, rendering it dense and preventing the plastic from penetrating. The reinforcement thereby is also exposed to a pressure, which is necessary to cause the reinforcement to assume its second condition with the greatest possible angle between the reinforcement threads 5,6. When thereafter the thermosetting resin is cured, the threads 5,6 in the reinforcement are interlocked and connected intimately with each other by the flock and plastic material so that the pipe in its cured state has very good strength properties and resistance against very high inside and outside pressures, not the least because the reinforcement threads 5,6 in this position have an orientation substantially in parallel with radial planes through the pipe, as shown in FIG. 5.

Figures 7, 8, 12:
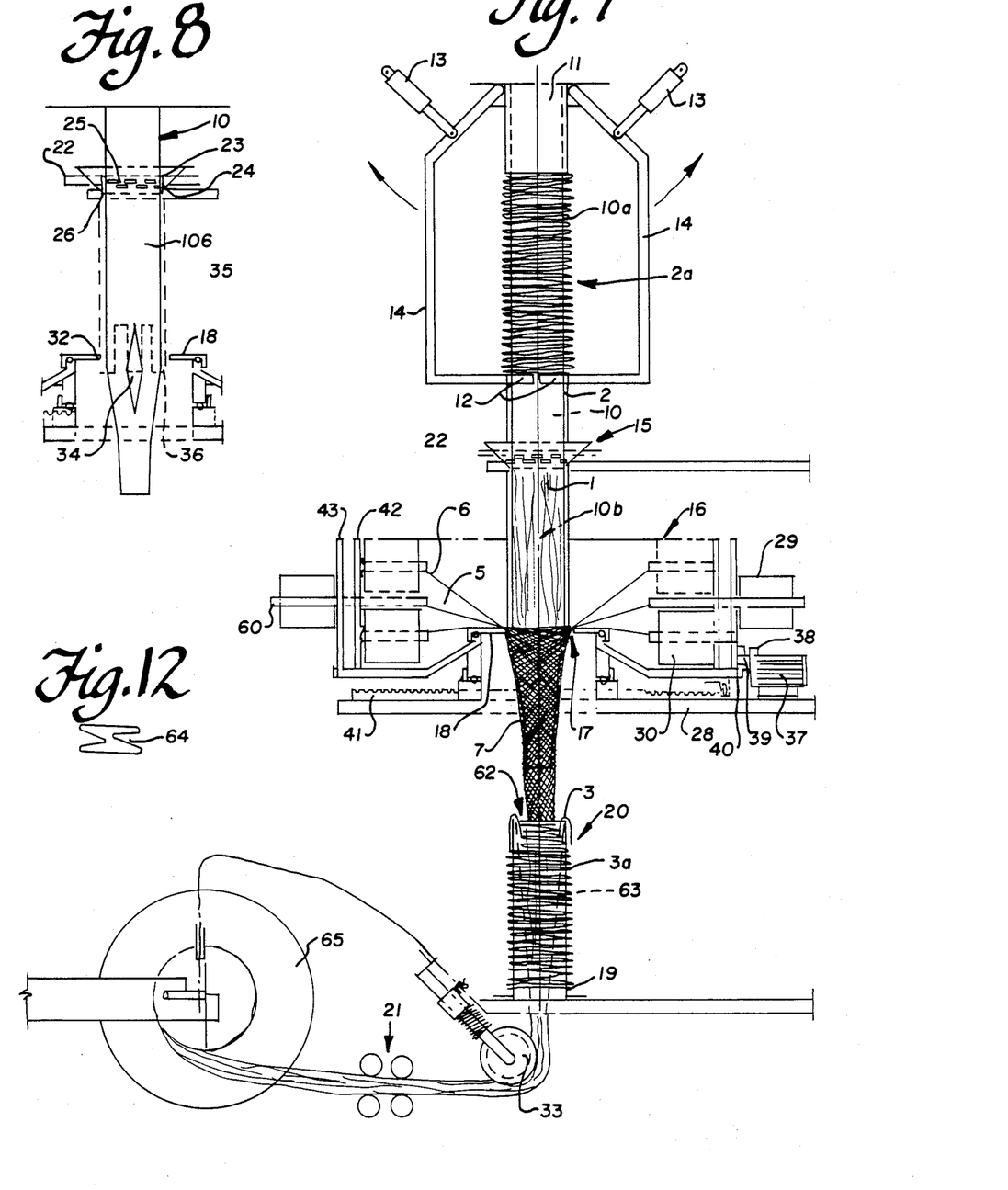
FIG. 7 is a lateral view, partly by section, of a machine for manufacturing pipes according to the invention, certain parts being omitted for reasons of clearness.
FIG. 8 is a closer view of some details in the machine.
FIG. 12 is a sectional view of an alternative attachment of the movable thread bobbins.
Figure 9:
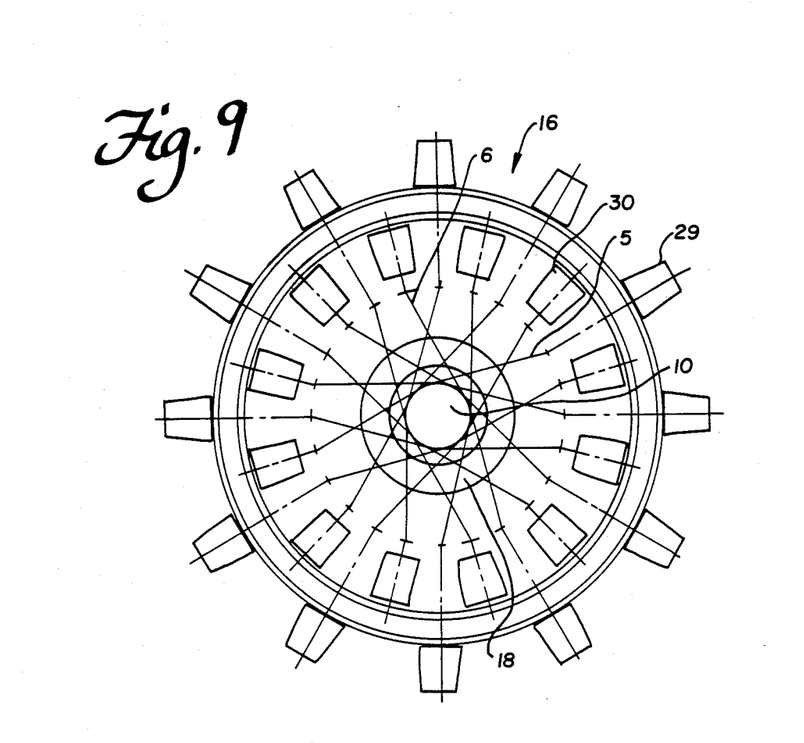
FIG. 9 is a section substantially along the line IX—IX in FIG. 7 for illustrating a braiding head comprised in the machine.
Figure 10:
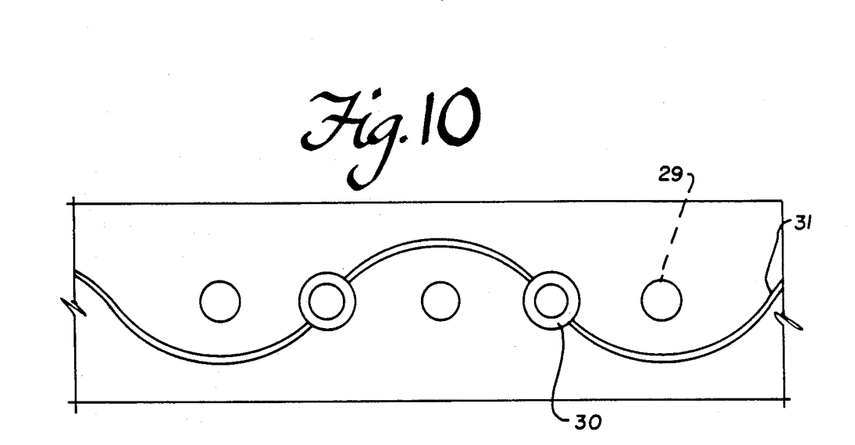
FIG. 10 shows schematically the extension of a guide groove for movable thread bobbins of the braiding head.
Figure 11:
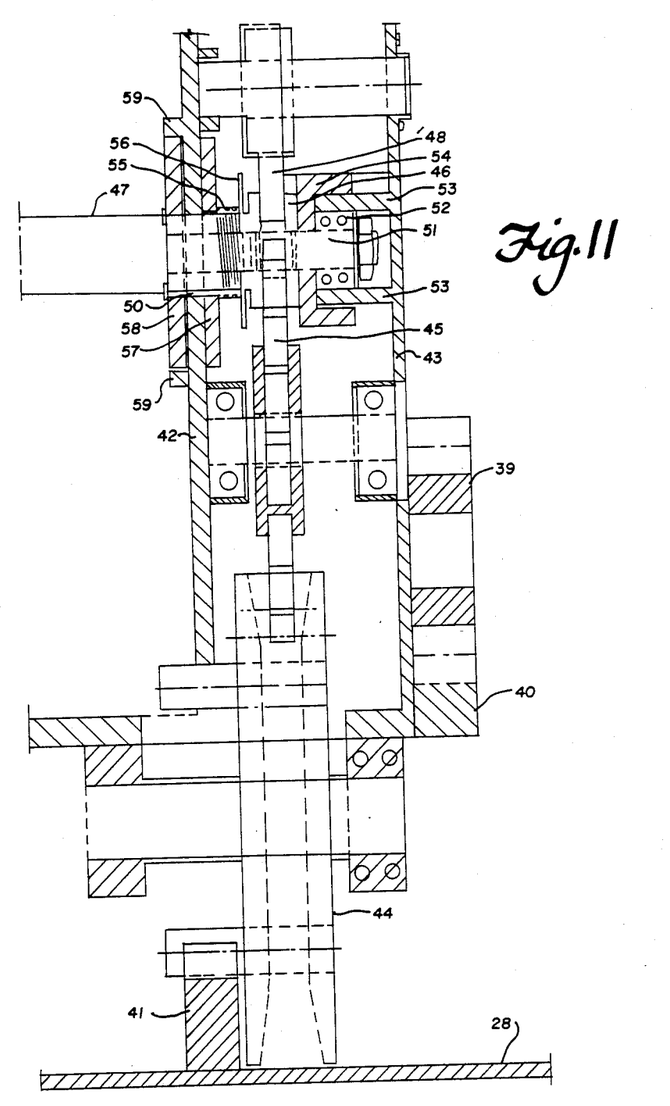
FIG. 11 is a sectional view on an enlarged scale of a drive mechanism for the braiding head.

In the following, a method and a machine for manufacturing pipes according to the invention are described, with reference to the FIGS. 7–11, which schematically illustrate an embodiment of the machine. In addition to a stand, which for reasons of clearness and simplicity is not shown in the Figures, the machine comprises a shaping mandrel 10, which is movable in a bearing or guide sleeve 11 supported by the stand and can be displaced relative to the sleeve 11 for example by means of a piston-cylinder device (not shown). In FIGS. 7 and 8 the mandrel 10 is shown in operative position, in which the mandrel at its upper portion 10a facing toward the sleeve 11 is provided with a foil supply 2A, which is retained on the mandrel 10 by means of jaws 12, which abut to and about the mandrel and are supported on arms 14, which can be swung outward by piston-cylinder means 13. Between said jaws and the mandrel the foil 2 is intended to be pulled out against the action of a force, which is determined by the contact pressure of the jaws against the foil 2 arranged about the mandrel 10, which contact pressure is adjustable by the piston-cylinder means 13. The mandrel 10 in its operative position extends from the jaws 12 through a spray nozzle 15 and as braiding head 16 with a portion 10b having a constant diameter, which diameter substantially shall correspond to the greatest inner diameter the pipe is intended to have. The supply portion 10a of the mandrel, i.e. the portion of the mandrel about which the foil supply is arranged, may, however, have a slightly smaller diameter though this is not necessary per se, because the hose-shaped foil as such shall have a slightly greater diameter than said portion of the mandrel, so that it will not get stuck during its movement along the mandrel 10. Said mandrel portion 10b terminates on the same level as a braiding plane 17, which is determined by a guide plate or braiding nozzle 18, whereafter the mandrel diminishes conically to a diameter, which shall be smaller than the smallest inner diameter of the hose.

For the outer foil 3 a foil supply 3A is arranged as shown about a tube or sleeve 18, from which supply the foil 3 is pulled through a hose folding device 20, which is formed within the sleeve, together with the inner foil 2 coming from the mandrel 10 and braiding head 16, by means of a feed device 21 for advancing with constant speed the hose being manufactured, by which feed device 21 the manufacturing speed can be controlled.

The spray nozzle 15 is disposed about the mandrel 10 and supported in a way not shown in detail by the machine stand. Thermosetting resin mass mixed with an ample amount of filler, preferably flocks, is pressed from a source (not shown) into the spray nozzle 15 through conduits 22 and to a chamber 23 within the spray nozzle via apertures 25 arranged in one wall 24 of said chamber. The other wall of the chamber consists of the mandrel 10 and the foil 2, which is placed about the mandrel and during operation movable at constant speed. The chamber 23 is of conical shape and terminates in an annular discharge opening 26, the width of which determines the thickness of the layer 1 of plastic mass applied to the inner foil while it is being pulled through the nozzle 15. In addition to said apertures 25, a further row of apertures can be provided in the chamber wall 24 near the discharge opening 26 for applying flocks to the outer surface of the thermosetting resin layer. In this case the flock amount admixed to the plastic mass can be reduced and in certain cases be omitted. Due to it stickiness when being applied to the foil 2, the thermosetting resin mass adheres to the foil 2 and follows along therewith through the braiding head 6 where the reinforcement 7 is applied, and through the folding device 20 where the outer foil 3 is applied about the reinforcement 7 and the adhesive thermosetting resin layer, which thereafter is protected by the outer foil.

In the braiding head 16 the fabric reinforcement 7 is braided directly on the thermosetting resin layer while the inner foil continuously is advanced longitudinally along the mandrel 10. For this purpose, the braiding head 16, which is disposed rotatable on table 28 comprised in the stand, is provided with thread bobbins 29 for, for example, the reinforcement threads 5, which bobbins are fixed relative to the rotary braiding head and located equally spaced on the outside thereof. The bobbins, thus, follow along with the braiding head 15 and with thread bobbins 30 for the other reinforcement threads, i.e. the threads 6 at the embodiment, which bobbins 30 are movable relative to the braiding head 15 and shown uniformly distributed on the inside of the braiding head. The movable bobbins 30 move in a direction opposed to the braiding head 15 along a substantially sinus-shaped guide path 31 (FIG. 10), in the symmetry plane of which the fixed bobbins 29 are located with their centre, whereby the movable bobbins 30 are caused to move above and below each second one of the fixed bobbins. By this relative movement between the fixed and the movable thread bobbins 29,30 the threads 5,6 are braided together about the thermosetting resin layer 7 and the inner foil 2 by guidance of the braiding nozzle 18, which with its inner edge 32 lying close to the outer surface of the plastic layer acts as a support for the threads 5,6 and permits the braiding taking place substantially in the braiding plane 17, i.e. slightly above the conical portion of the mandrel. In said braiding plane the reinforcement is braided about the thermosetting resin 1 to its greatest diameter. When the braided reinforcement located on the cylindric portion of the mandrel is exposed to the tensile forces brought about by the feed means 21, in the first place the reinforcement portions located closest to the conical portion of the mandrel are tightened about the plastic layer 1, i.e. the angle α between the threads 5,6 diminishes slightly, and thereby the forces increase which tend to retain the reinforcement on the cylindric portion of the mandrel, and also the tension in the reinforcement between the mandrel and a spring-actuated guide wheel 33 for maintaining constant tensile stress increases, whereby the reinforcement therebetween is stretched and contracted to its smallest diameter, which the reinforcement shows when it passes the guide wheel 33, and additional reinforcement is then pulled off from the cylindric mandrel portion. The increase in length given to the reinforcement by the contraction in relation to the foil 2, which is fed at constant speed through the braiding plane 17, is compensated for by a certain sliding between the foil and the thermosetting resin layer 1 and by the forces, which are directed oppositely in relation to said tensile forces and tend to retain the reinforcement on the cylindric mandrel portion, thereby inhibiting the movement of the plastic layers located closest to the reinforcement so that these layers will move with a slightly lower speed than the plastic layers located closest to the foil. This is rendered possible owing to the viscous or dough-like consistency of the thermosetting resin which without greater resistance permits relative movements between the different layers and results in that the thermosetting resin layer is stretched and becomes thinner than it was at the beginning. In order to preserve in connection therewith a certain part of the plastic, the mandrel 10 is provided in the transistion to the conical portion with a plurality of grooves 34 in parallel with the feed direction, into which grooves a certain amount of plastic can be pressed together with the foil, which hereby is slightly folded.

Instead of braiding the reinforcement directly on the thermosetting resin layer, according to the invention the reinforcement can be braided on a thin sleeve 35, which for example suspends from the spray nozzle and encloses the termosetting layer as schematically shown in FIG. 8 by dashed lines. Said sleeve 35 terminates with its lower edge slightly beneath the braiding plane 17 and is slotted in this lower portion to form resilient fingers 36 supporting the reinforcement, about which fingers the reinforcement can be contracted and from which the reinforcement is pulled off when being exposed to the necessary tension. In this case the foil 2 and the plastic layer 1 move unobstructed inside of the sleeve 35, and the thermosetting resin layer is exposed less to disturbances than at the aforedescribed example and maintains substantially its thickness.

The braiding head 16 is driven at a constant rotation speed, which is adjusted to the feed speed of the foil, by a motor 37 via a gear 38 and a pinion 39, which cooperate with a gear ring 40 attached to the outside of the braiding head and extending all about. On the table 28, further, a gear ring 41 extending all about is rigidly mounted which by rotation of the braiding head drives a drive wheel 44 mounted at the lower surface of the braiding head, which drive wheel via an intermediate wheel 45 drives a chain 46 located between the walls 42,43 and extending all about the braiding head, with which chain each movable bobbin 30 is rigidly connected by its axle 47 following the guide path. In order to ensure gear meshing between the chain 46 and the intermediate wheel 45, a holder-on wheel 48 meshing with the chain can be provided above the intermediate wheel 45.

Each axle 47 extending through a groove 50, which follows the guide path 31, in the inner wall 42 is provided at its end with an axle journal 51, which is rigidly screwn into said end and constitutes a guide split-pin in the chain. The axle journal 51 carries at its end a bearing 52 between two flanges 53, which form the guide path 31 and are attached to the inside of the outer wall 43 of the braiding head. On each axle journal 51, further, is mounted a U-shaped slide-shoe 54 between the chain 46 and the flanges 53. In order to prevent the axle 47 from moving in the inward direction, a spring 55 is provided between a stop disc 56 connected to the axle and the inner wall 42, which wall can be reinforced at 57 on both sides of the groove 50. For guiding the axle on the inner surface of the inner wall 42, the axle can be provided with a guide plate 58, which runs between guide flanges 59 extending along the guide path 31 and located on the inner surface of the inner wall.

Every movable thread bobbin 30 is mounted exchangeably on its radially inward directed hollow axle 47, which acts as a guide tube for the thread, which by a reeling device known per se and therefore not shown in reeled off from the bobbin and thereafter braided together with the threads 5 from the fixed bobbins 29, which also are mounted exchangeably each on a radially inward extending tube axle 60, and from which the threads 5 are reeled off in the same way as from the movable bobbins 30, at a speed adjusted to the rotation speed of the braiding head in order to obtain the intended braiding tension in the threads 5,6.

After the braiding head, as mentioned before, the outer foil 3 is applied about the reinforcement 7 by being pulled along from its supply. Thereafter the hose, which consists of the inner foil 2, thermosetting resin layer 1, reinforcement 7 and outer foil 3, is drawn through the folding-together device 20 where the hose is folded together to the flat cross-sectional shape shown in FIG. 12. The device 20 for this purpose has a tapering through opening 62 with two opposed plane surfaces 63, and with fold-forming strips (not shown), which extend vertically between said plane surfaces and are located opposite each other, to form the folds 64 in FIG. 12. The hose thus folded then is reeled on a drum 65, which is driven via the feed device 21 or provided with a separate drive means, on which drum the hose then is stored until it is to be used.

Figure 13:
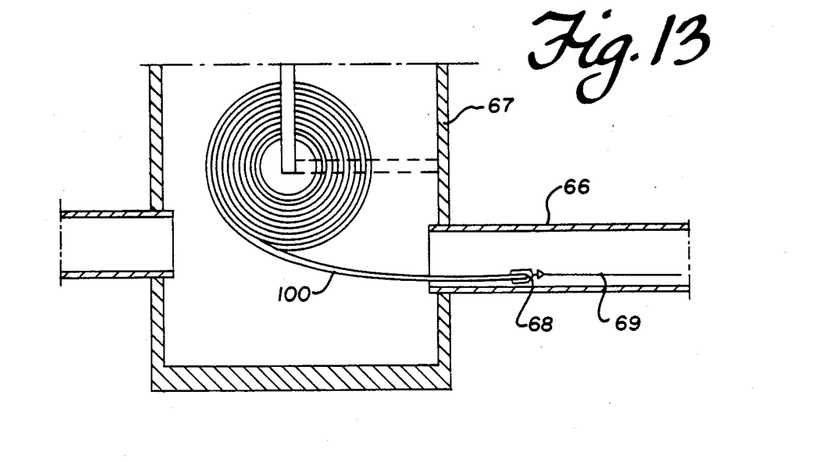
FIG. 13 is a section substantially along the line XIII—XIII in FIG. 7.
Figure 14:
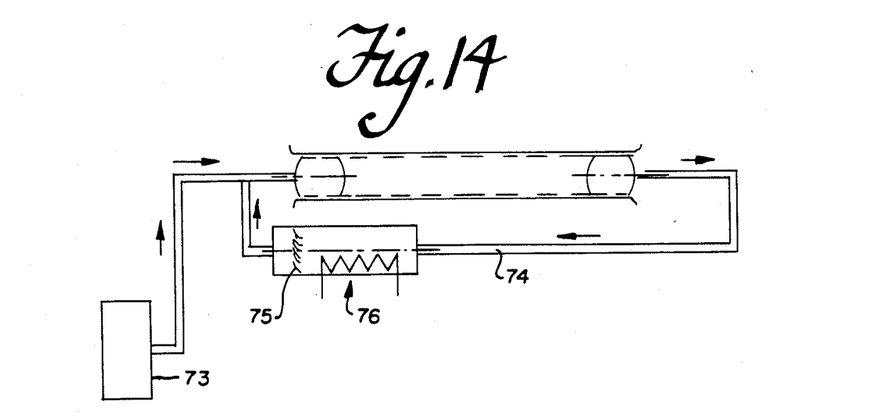
FIG. 14 illustrates schematically a possible way of applying a pipe according to the invention in an existing conduit to be repaired.
Figure 15:
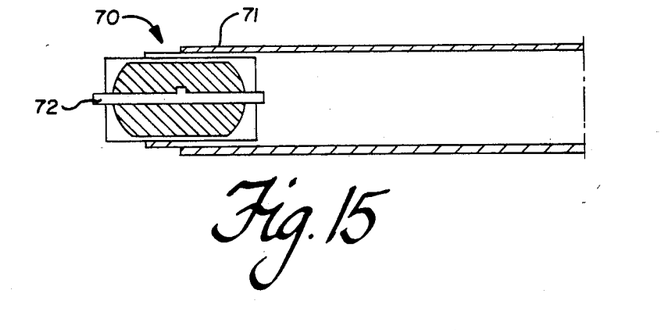
FIG. 15 shows schematically a curing and end forming device applied in place for giving the pipe its final shape.

In FIGS. 13 to 15 a method and an equipment are illustrated by way of example to show how a hose 100 according to the invention is applied in a conduit, which is to be renovated, repaired and/or made tight. 66 designates such a sewer conduit, which extends between two gullies 67, of which only one is shown in said Figures. The hose 100 is reeled off the suspended drum 65 and drawn through the conduit to the other gully by means of a drawing device, for example a rope 69 provided with grip members 68, in such a manner that a certain hose surplus is located within the conduit 66. This surplus shall correspond to the decrease in length to which the hose will be exposed when the reinforcement 7 is widened. The hose 100 is separated from the drum 65, and into both ends of the conduit a curing and end forming device 70 is inserted, which is provided with a locking means 71 capable to be pressed out and a distribution pipe 72. One of said devices is connected with its pipe 72 to a pressure source 73 (FIG. 15) for the introduction of compressed air, water under pressure or some other pressure agent both into the locking means 71 of the devices for locking the hose ends against the inside of the conduit and into the hose 100 to build up a forming pressure therein. The two devices 70 are also connected to each other through a circulation conduit 74, which comprises a pump 75 and a heating device 76 for heating the circulating medium to the necessary temperature for curing the thermosetting resin. The catalyst required for initiating the curing can, as mentioned before, having been admixed to the thermosetting resin or be supplied to the same by means of the pressure agent, in which latter case the inner foil 2 shall be pervious to gas and, therefore, can consist of an ionomer plastic, for example of the type being commercially available under the name "SURLYN A".

When the hose is exposed to the forming pressure, it is widened in the way described above against the conduit 66 and to an extend permitted by the reinforcement, which hereby transforms to the state shown in FIG. 5 with the greatest possible angle between the threads 5,6 of the reinforcement. The hose dimension shall be such, that the hose with its outside is pressed against the inside of the conduit, but this is not per se necessary, because the hose cannot be widened more than permitted by the reinforcement. This implies that the hose cannot be pressed out to a great extent through holes possibly found in the conduit, and that per se no external support in the form of a pipe is required to give the hose its final pipe shape. When the reinforcement widens, the hose is contracted, i.e. it shrinks, and as it is clamped at its ends it can be exposed to certain tensional stresses in order to eliminate possible folds in the hose. Thereby the hose or the pipe according to the invention have been given their final shape, and the thermosetting resin can be cured to render the pipe shape permanent.

As further examples of the material of which the inner foil 2 may consist can be mentioned polyurethan rubber, polyethylene, for example ethene vinyl acetate, and PVC. When for example polyurethan rubber is used, the inner foil detaches rapidly from the cured thermosetting resin and can be pulled out from the pipe, but with a foil of the other materials mentioned and with addition of fibres the inner foil is bonded to the cured thermosetting resin. For the outer foil substantially PVC plastic is used. As filler in the thermosetting resin may also be used hard crystals of aluminium oxide or silicon carbide, carbon fibres and boron fibres in order to increase the wear strength of the pipe and its resistance to abrasion, and asbestos and mica may be used in order to increase the heat resistance of the pipe.

The present invention is not restricted to what is described above and shown in the drawings, but can be altered and modified in many different ways within the scope of the invention idea set forth in the attached claims.

What I claim is:

1. A pipe of thermosetting resin, characterized in that it comprises a layer of curable thermosetting resin enclosed between a hose-shaped inner foil and a hose-shaped outer foil, which layer in its curable state together with said two foils forms the shape of a flexible foldable hose, in which shape the pipe is intended to be applied or laid in the place in question and after its application or laying is given its final shape and is made shape permanent by curing the thermosetting resin.

2. A pipe according to claim 1, characterized in that the layer of curable thermosetting resin is reinforced by a fabric reinforcement braided of thread systems movable relative to each other, which fabric reinforcement owing to the relative movability of the thread systems can be widened and contracted to change the diameter of the pipe in the form of a flexible hose, and said thread systems are interlocked by the thermosetting resin in its cured state.

3. A pipe according to claim 1, characterized in that the thermosetting resin contains filler at least in the form of flocks, chips or the like.

4. A pipe according to claim 1, characterized in that the thermosetting resin for its curing is prepared in advance by a catalyst, which starts the curing when it is exposed to heat or pressure.

5. A pipe according to claim 1, characterized in that the inner foil is pervious to gas for introducing a catalyst to start the curing after the pipe has been applied or laid in the place in question.

6. A pipe comprising a layer of curable thermosetting resin and a fabric reinforcement braided of thread systems movable relative to each other enclosed between a hose-shaped inner foil and a hose-shaped outer foil, which fabric reinforcement owing to the relative movability of the threaded systems can be extended and contracted in response to changes in the diameter of the pipe when the resin is in the curable state and which thread systems are interlocked by the cured thermosetting resin, the two foils and the fabric reinforcement forming the shape of a hose which is flexible and curable when laid at its place of use, the hose subsequently receiving a permanent shape by the curing of the thermosetting resin.

7. A pipe according to claim 6, wherein the threads of the reinforcement consists of multifilaments or roving.

8. A pipe according to claim 6 wherein the thermosetting resin contains filler.

9. A pipe according to claim 8, wherein the filler is in the form of fibres and/or powders.

10. A pipe according to claim 6, wherein the thermosetting resin contains a catalyst for curing the thermosetting resin when exposed to heat or pressure.

11. A pipe according to claim 6 wherein the inner foil is pervious to gas for introducing a catalyst to start the curing after the pipe has been laid in position.

* * * * *